United States Patent
MacDonald

(10) Patent No.: US 8,052,788 B2
(45) Date of Patent: Nov. 8, 2011

(54) METHOD OF PRODUCING SILICA SOLS WITH CONTROLLABLE BROAD SIZE DISTRIBUTION AND MINIMUM PARTICLE SIZE

(75) Inventor: Dennis L. MacDonald, Wheaton, IL (US)

(73) Assignee: Nalco Company, Naperville, IL (US)

( * ) Notice: Subject to any disclaimer, the term of this patent is extended or adjusted under 35 U.S.C. 154(b) by 396 days.

(21) Appl. No.: 12/237,047

(22) Filed: Sep. 24, 2008

(65) Prior Publication Data
US 2009/0018219 A1    Jan. 15, 2009

Related U.S. Application Data

(63) Continuation-in-part of application No. 11/200,998, filed on Aug. 10, 2005, now abandoned.

(51) Int. Cl.
*C04B 14/04* (2006.01)
*B01J 21/00* (2006.01)
*C01B 33/12* (2006.01)
*C01B 33/141* (2006.01)
*B24D 3/02* (2006.01)
*C09C 1/68* (2006.01)
*C09K 3/14* (2006.01)
*B28B 7/38* (2006.01)

(52) U.S. Cl. .......... 106/482; 502/232; 423/335; 51/308; 427/133; 516/81; 516/82

(58) Field of Classification Search ............... 106/482; 502/232; 423/335; 51/308; 427/133; 516/81, 516/82
See application file for complete search history.

(56) References Cited

U.S. PATENT DOCUMENTS

| | | | | |
|---|---|---|---|---|
| 3,128,251 A * | 4/1964 | Reven et al. | | 516/81 |
| 3,650,977 A * | 3/1972 | Bobb | | 516/86 |
| 3,789,009 A * | 1/1974 | Irani | | 516/83 |
| 4,996,084 A | 2/1991 | Elkachouty | | |
| 5,100,581 A * | 3/1992 | Watanabe et al. | | 516/82 |
| 5,221,497 A * | 6/1993 | Watanabe et al. | | 516/83 |
| 5,458,812 A | 10/1995 | Brekau et al. | | |
| 5,964,693 A | 10/1999 | Brekau et al. | | |
| 6,238,272 B1 | 5/2001 | Tanaka et al. | | |
| 6,372,806 B1 * | 4/2002 | Keiser et al. | | 516/82 |
| 6,486,216 B1 | 11/2002 | Keiser et al. | | |
| 6,747,065 B1 * | 6/2004 | Paszkowski | | 516/83 |
| 6,764,539 B2 | 7/2004 | Terase et al. | | |
| 6,906,109 B2 | 6/2005 | Paszkowski | | |
| 2004/0203324 A1 | 10/2004 | Smith et al. | | |
| 2005/0079804 A1 | 4/2005 | Taylor et al. | | |
| 2005/0234136 A1 | 10/2005 | Holland et al. | | |
| 2006/0283095 A1 | 12/2006 | Mahulikar et al. | | |

FOREIGN PATENT DOCUMENTS
JP    05-170424    *    7/1993

* cited by examiner

*Primary Examiner* — Patricia L Hailey
(74) *Attorney, Agent, or Firm* — Edward O. Yonter; Michael B. Martin

(57) ABSTRACT

Colloidal silica having a controllable broad particle size distribution and a controllable minimum particle size is disclosed and claimed. Particles below a predetermined size are excluded from the product colloidal silica of the invention. A method for continuously producing the desired colloidal composition is disclosed comprising the steps of providing preformed silica particles having a surface area which controls the particle size of the colloidal silica product, adding a feed silica comprising an alkaline solution and silicate at a feed rate which is less than a nucleation rate.

16 Claims, 3 Drawing Sheets

Example 1 Product vs Feed Material

Example 4 vs Example 5

METHOD OF PRODUCING SILICA SOLS WITH CONTROLLABLE BROAD SIZE DISTRIBUTION AND MINIMUM PARTICLE SIZE

CROSS REFERENCE TO RELATED APPLICATION

This is a continuation-in-part application of U.S. patent application Ser. No. 11/200,998, entitled "SILICA SOLS WITH CONTROLLED MINIMUM PARTICLE SIZE AND PREPARATION THEREOF," filed on Aug. 10, 2005, now abandoned, which is incorporated herein by reference in its entirety.

TECHNICAL FIELD

The present invention relates to colloidal silica sots having a broad particle size distribution prepared by a continuous process. More specifically, the invention relates to silica sols having a pre-determined minimum particle size and desirable particle size distribution curve prepared without the use of multiple reactors.

BACKGROUND

The preparation of silica sols that contain non-aggregated spherical particles is well known. A means of preparing such silica sols includes using an acidic, active solution of silicate (sometimes referred to as silicic acid) and grows particles in an alkaline water based media at elevated temperatures. Typically the resulting solutions are low in concentration and are normally further concentrated before sale. An alternative route is to concentrate via evaporation while the particles are growing (i.e., during the reaction).

Typical means to grow particles are via a batch basis or with a continuous system. Batch basis techniques normally make narrow distribution particles. Continuous systems typically make broad distribution particles. To have good particle size control, continuous systems are complex and employ multiple overflow reactors. Besides being capital intensive, such continuous reactors do not have good control over particle size distribution and are limited in average particle size (e.g., U.S. Pat. No. 5,964,693 utilizes five overflow reactors and discloses particles of 27 to 72 nm). Another disadvantage of these continuous systems is that while very small particles can be reduced they cannot be totally eliminated.

There thus exists an industry need to eliminate the disadvantages of continuous reaction systems. Particularly, there is a need to economically produce silica particles having a controlled minimum particle size and wide distribution curve.

SUMMARY

The colloidal particles produced using the method of the invention have expansive industrial applicability. For example, colloidal silica has long been successfully used for polishing various materials, such as silicon, gallium arsenide, indium phosphide, and titanium to form a super-smooth and scratch-free surface finish. Colloidal silica slurries used for chemical-mechanical polishing (CMP) typically include aqueous colloidal silica with an etchant (oxidizer) as a polishing promoter. Various kinds of chemicals are used in colloidal silica slurries for different polishing applications to achieve either a high material removal rate or better-polished surface finishes with fewer polish defects.

In an embodiment, the invention includes industrially desirable colloidal silica particle compositions having increased control over particle size uniformity and narrow or wide particle size distribution. The colloidal particles have a controlled minimum particle size and are produced by a method wherein preformed silica sol particles of predetermined minimum particle size are added to a single agitated, heated reactor. Other components including an alkaline agent and silicic acid are added preferably simultaneously to the reactor at a rate that is less than a rate of nucleation of new colloidal silica particles. The minimum particle size of the resulting colloidal silica is controlled by the particle size of the preformed silica sol.

According to an embodiment, the invention includes a method for producing colloidal silica particles having a broad particle size distribution. The method includes feeding a first component including preformed silica sol particles of predetermined minimum particle size to at least one agitated, heated reactor. A second component including silicic acid is fed to the reactor at a rate that is less than a new silica particle nucleation rate. A third component including an alkaline agent is also added to the reactor, where the alkaline agent preferably maintains a ph of about 8.0 to about 12.5 in the reactor.

Preferably, the method of the invention includes a single overflow reactor. Multiple reactors may also be used according to alternative embodiments. Average particle sizes can be controlled from about 10 nm up to over 150 nm in diameter. In addition, because the invention utilizes pre-manufactured cofeed colloidal sol without the formation of new particles, very small particles can be eliminated from the resultant product. It should be appreciated that this invention generally relates to the particle formation step and not the preparation of the silicic acid step or any concentration steps.

Additional features and advantages are described herein, and will be apparent from, the following Detailed Description, Examples, and Figures.

DETAILED DESCRIPTION

Figure 1:
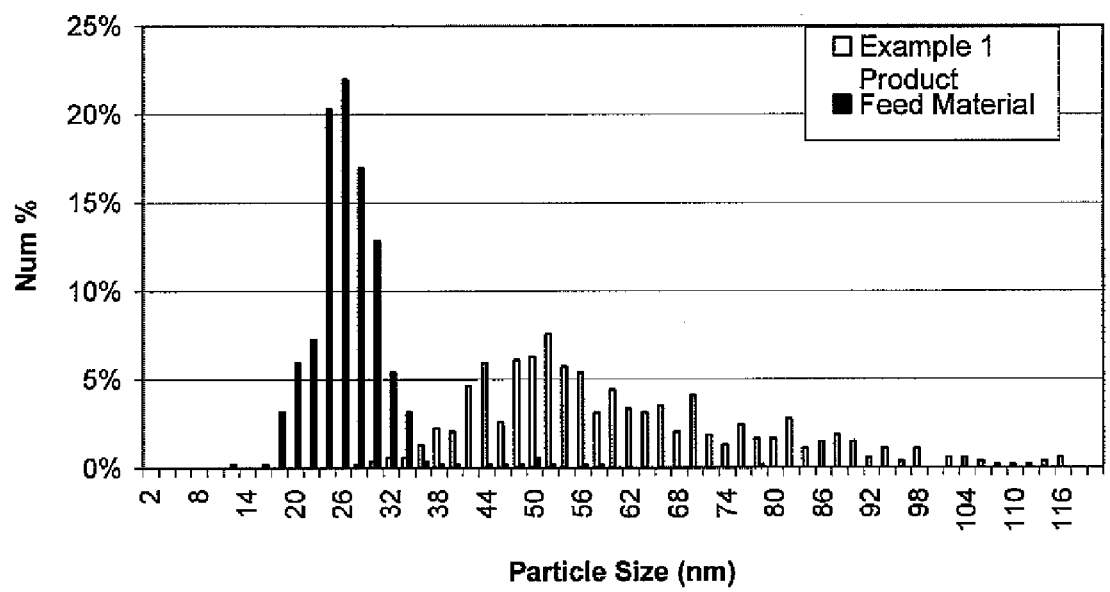
FIG. 1 shows the numeric % of the feed material and the resulting product of Example 1.

"Colloidal silica composition" and other like terms including "colloidal", "sol", and the like refer to an aqueous two-phase system having a dispersed phase and a continuous phase. The colloids of the present invention have a solid phase dispersed or suspended in a continuous or substantially continuous liquid phase, typically an aqueous solution. Thus, the term "colloid" encompasses both phases whereas "colloidal particles" or "particles" refers to the dispersed or solid phase.

"Stable" means that the solid phase of the colloid is present, dispersed through the medium and stable throughout this entire pH range with effectively no precipitate.

Methods for producing the colloidal silica particles of the invention include the steps of providing preformed silica particles having a predetermined particle size or particle size distribution, providing an alkaline agent, and providing a silicic acid. These components are typically fed into the reactor at a controlled rate which will prevent new nucleation from occurring in the reaction vessel. In a continuous reactor, particle size and distribution remain generally constant after steady state conditions are achieved. It was discovered that the particle size distribution of the colloidal silica compositions of the invention may be precisely controlled in a single reactor continuous process in a manner previously thought to be impractical. To ensure that only the preformed colloidal particles are grown upon, the feed rate of the silicic acid is maintained at a rate less than the nucleation rate for forming new particles.

The feed rate is preferably 10.0 grams of silica, as $SiO_2$ per 1,000 meters squared of surface area per hour at 90° C., so that new nucleation is avoided entirely. This feed rate is temperature-dependent with higher feed rates possible with higher temperatures. In this manner, colloidal silica can be "grown" to any desired particle size, while maintaining a desired particle size distribution and avoiding nucleation of new particles. By monitoring the feed rate of each component, the accretion of resulting colloidal silica can be maximized and therefore, the production of the silica can be maximized.

Another feed component for the present invention includes a preformed colloidal particle. While a broad distribution particle could be used, some of the advantages of the current invention would not be obtained. Typically, this component includes colloidal particles having a narrow distribution. These particles are what the silicic acid deposits on during the formation of the broad particle size distribution silica of the invention. Therefore, the particle size of the preformed particles used is the desired minimum particle size of the resulting broad distribution product and essentially all of the produced colloidal silica particles are larger than the preformed silica sol particles. The desired average particle size and particle size distribution of the resultant silica sol is typically identified and the preformed silica and the ratio of preformed silica to silicic acid are accordingly used. Increasing the particle size of the preformed silica sol particles increases the minimum and average particle size of resulting colloidal silica.

In an embodiment, the average particle size of the produced colloidal silica of the invention is dependent on the ratio of the silicic acid to the preformed colloidal silica and the average particle size of the preformed colloidal silica. For example, if the ratio of silicic acid to preformed colloidal silica is increased, each particle being fed to the reactor will have more silicic acid deposited on it and therefore a larger average particle size. If the ratio is kept the same, but a larger particle size of the pre made colloidal silica is used, a larger average particle size will result. To keep the same average particle size, but narrow the distribution curve, a larger preformed particle could be used with an increased ratio of the silicic acid to pre made colloidal silica.

An exemplary method of preparing the silicic acid solution is to pass a sodium silicate solution through a bed of $H^+$-cation exchange resin. The resulting deionized silicic acid solution tends to be quite reactive and is typically kept cooled to retard polymerization. Upon addition of the silicic acid solution to the alkaline solution to form the "feed silica" or heel. The heel or feed silica contains alkaline agents, such as NaOH, KOH, $NH_4OH$, the like, and combinations thereof.

Typically, silicic acid has a concentration of 4 to 8% and has a pH in the range of about 2 to 4. Any silicic acid that can be used for other silica particle growth techniques is contemplated for use in the present invention. It should be appreciated that any suitable type of silicic acid solution can be utilized and that the silicic acid may be made by through any suitable methodology.

The feed rate of the silicic acid should be maintained below the rate at which new nucleation occurs. The maximum feed rate is dependent on the reactor volume and the reaction temperature. The greater the volume, the greater the maximum feed rate. The higher the temperature, the greater the maximum feed rate. For a typical continuous system that does not use preformed colloidal particle feed, new particles are formed in the reactor. Through the method of this invention, a minimum particle size boundary may be maintained.

The alkaline agent feed component to the reactor system is typically a base material to maintain an alkaline system. Alkalines normally used in silica sol production are all acceptable. Typical alkaline agents have pH ranges (ideal for silica sol production) between about 8.0 to about 12.5. Dilute solutions are normally used to prevent gel formation. Examples of suitable alkaline agents include, but are not limited to, sodium hydroxide, potassium hydroxide, ammonia hydroxide, sodium silicate, potassium silicate, the like, and combinations thereof.

The minimum particle size of the resulting colloidal silica may be controlled by the particle size of the preformed silica sol, and wherein the broad particle size distribution is dependent on the ratio of the preformed silica sol to the silicic acid. For example, increasing the ratio of silicic acid to preformed colloidal silica will broaden the distribution curve and also increases the average particle size. To keep the same average particle size but narrow the distribution curve, a larger preformed particle and increased silicic acid to preformed colloidal silica ratio may be used.

In an embodiment, the reactor used for this invention is a single overflow unit. Heat input is necessary with reaction temperatures typically greater than 40° C. Maximum temperatures are normally dependent on the reactor pressure rating. Upper end temperatures of 150 to 200° C. are typical. However, if the reactor has a higher pressure rating, higher temperatures could be employed.

As with other continuous systems, this system should preferably be operated long enough to achieve steady-state conditions. After the first run, previously made product can be used for the initial reactor contents (assuming the same product is to be made). According to this embodiment, steady-state conditions are maintained in the reactor by seeding the reactor with produced colloidal silica particles from a previous run.

The foregoing may be better understood by reference to the following examples, which are intended for illustrative purposes and are not intended to limit the scope of the invention.

Example 1

A 3-liter agitated flask equipped with a bottom outlet was used. Tubing collected to the bottom outlet was raised so that flask would contain 2-liters of material before overflow occurred. To the flask, 2-liters of DI water were charged and heated, with agitation, to 95° C. Silicic acid at 7.41% solids was charged at a target rate of 9.57 gm/min. A sodium-based colloidal silica sol was charged at a target rate of 0.7 gm/min at a concentration of 43.7% solids and a titrated particle size of 20.5 nm. To maintain pH at 9.3 to 9.6, 5% NaOH was also added. As the three feed streams were charged to the reactor, there was a continuous overflow to maintain the 2-liter volume. The feeds were continued until 9.6 liters were collected (4.8 reactor turnovers). The system was then deemed in steady state and product was collected. Particle size analysis of the product showed a very broad distribution with a peak of 52 nm. The smallest particle size was 28 nm. FIG. 1 shows the numeric % of the feed material and the resulting product.

Example 2

To the same setup as Example 1, silicic acid at 6.7% solids was charged at 24.78 gm/min. A potassium-based colloidal silica having a titrated particle size of 11.7 nm and was 29.8% solids was charged at 1.169 gm/min. 4.5% KOH was used to maintain a pH of 9.3 to 9.6. The feeds were continued until 10-liters were collected (5 reactor turnovers). The system was then deemed in steady state and product was collected. Particle size analysis of the product showed a broad distribution material with a medium particle size of 22.5 nm. The ratio of silicic acid to the potassium based colloidal silica was 4.78 to 1.

Example 3

Figure 2:
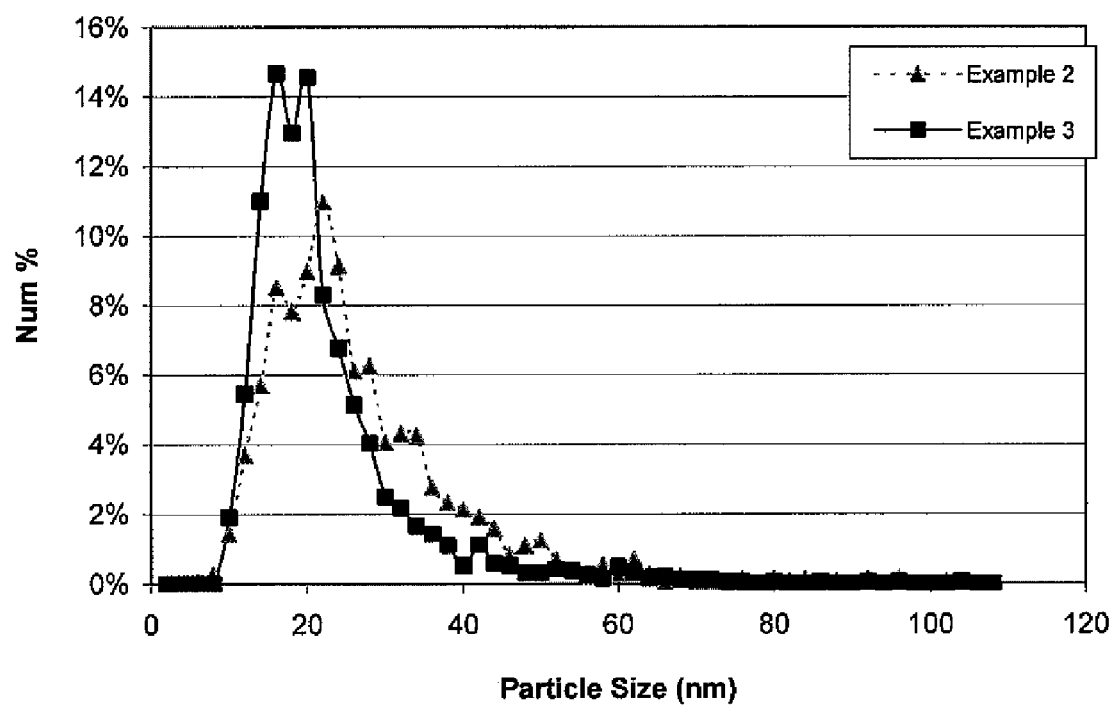
FIG. 2 shows the particle size distribution for particles formed using the technique explained in Examples 2 and 3.

This example was similar to Example 2, but with a different ratio of silicic acid to potassium based colloidal silica. The new ratio of silicic acid to the potassium-based colloidal silica was 3.21 to 1. The desired result was to lower the average particle size and narrow the particle distribution. This result did occur with the average particle size being reduced to 18.3 nm. FIG. 2 shows the particle size distribution of Example 2 and 3.

Example 4

To a 500-gallon agitated reactor (at 93° C.) with an overflow line set to achieve 315-gallons in the reactor, 8.5 lb/min of silicic acid (6.5% concentration), 0.32 lb/min of 22 nm potassium-based colloidal silica (30% concentration), and 4.5% KOH (rate variable to maintain 9.3 to 9.6 pH) were charged. After steady state conditions were achieved, product was collected and concentrated. Resulting product had an average particle size by titration of 63.4 nm.

Example 5

Figure 3:
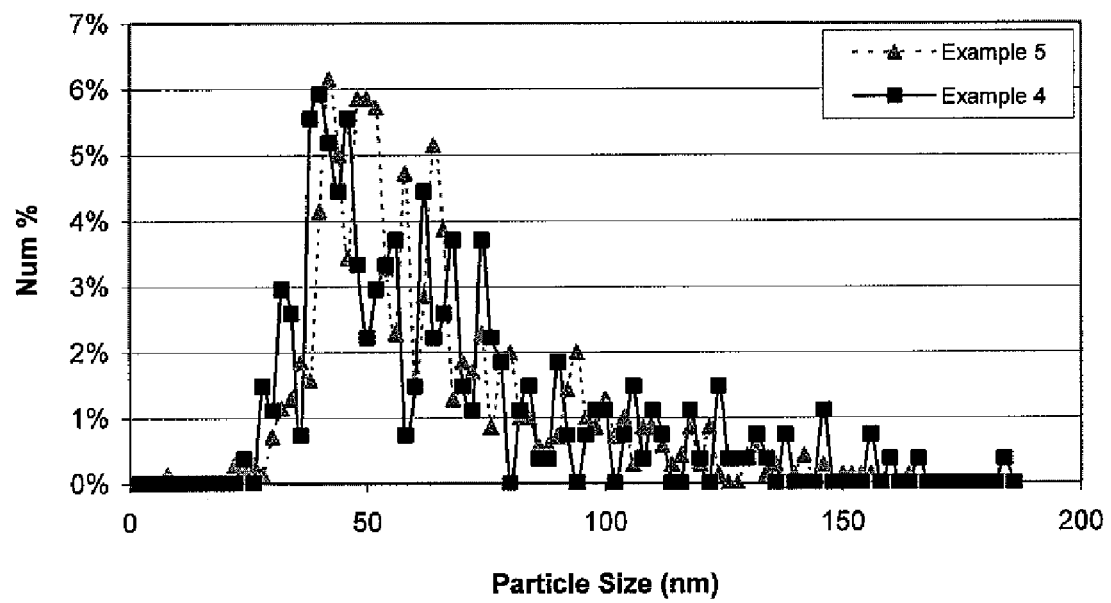
FIG. 3 shows the particle distribution for particles formed using the technique explained in Examples 4 and 5.

To the same reactor system as Example 4, 8.5 lb/min of silicic acid (6.5% concentration), 0.50 lb/min of 35 nm potassium based colloidal silica (30% concentration), and 4.5% KOH (rate variable to maintain 9.3 to 9.6 pH) were charged. After steady state conditions were achieved, product was collected and concentrated. Resulting product had an average particle size by titration of 61.4 nm. However, this particle distribution was narrower than Example 4. FIG. 3 shows the particle distribution of Example 4 and 5.

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method for producing colloidal silica particles having a broad particle size distribution, the method comprising, in any order:
   (a) feeding a first component including preformed silica sol particles of predetermined minimum particle size to at least one agitated, heated reactor;
   (b) adding a second component including silicic acid to said reactor, wherein the second component is fed to the reactor at a rate that is less than a new silica particle nucleation rate;
   (c) adding a third component including an alkaline agent to the reactor; and
   (d) wherein the minimum particle size of the resulting colloidal silica is controlled by the particle size of the first component, and wherein the broad particle size distribution is dependent on the ratio of the feed rates of the first component to the second component.

2. The method of claim 1, wherein essentially all of the produced colloidal silica particles are larger than the preformed silica sol particles of the first component.

3. The method of claim 1, wherein an average particle size of the broad particle size distribution is determined by an average particle size of the first component.

4. The method of claim 1, wherein an average particle size of the broad particle size distribution is determined by the ratio of the feed rates of the first component to the second component.

5. The method of claim 4, wherein increasing said ratio causes the broad particle size distribution curve to become wider.

6. The method of claim 4, including causing an average particle size of the broad particle size distribution curve to increase.

7. The method of claim 1, including creating a narrower particle size distribution curve without changing an average produced particle size by including in the first component larger preformed silica sol particles and increasing a second component to first component feed rate ratio.

8. The method of claim 1, wherein said reactor is a single overflow reactor.

9. The method of claim 1, wherein said reactor is a series of reactors.

10. The method of claim 1, including concentrating the produced colloidal silica particles.

11. The method of claim 1, including concentrating via evaporation during the reaction.

12. The method of claim 1, wherein said reactor is maintained at a temperature in the range of about 40 to about 200° C.

13. The method of claim 1, wherein the alkaline agent maintains a pH from about 8.0 to about 12.5.

14. The method of claim 1, wherein said reactor is held at a constant volume by continuous removal of the produced colloidal silica from the reactor.

15. The method of claim 1, including operating the method as a continuous process.

16. The method of claim 1, including maintaining steady-state conditions in said reactor by seeding the reactor with produced colloidal silica particles from a previous run of the reactor.

* * * * *